Figure 2:
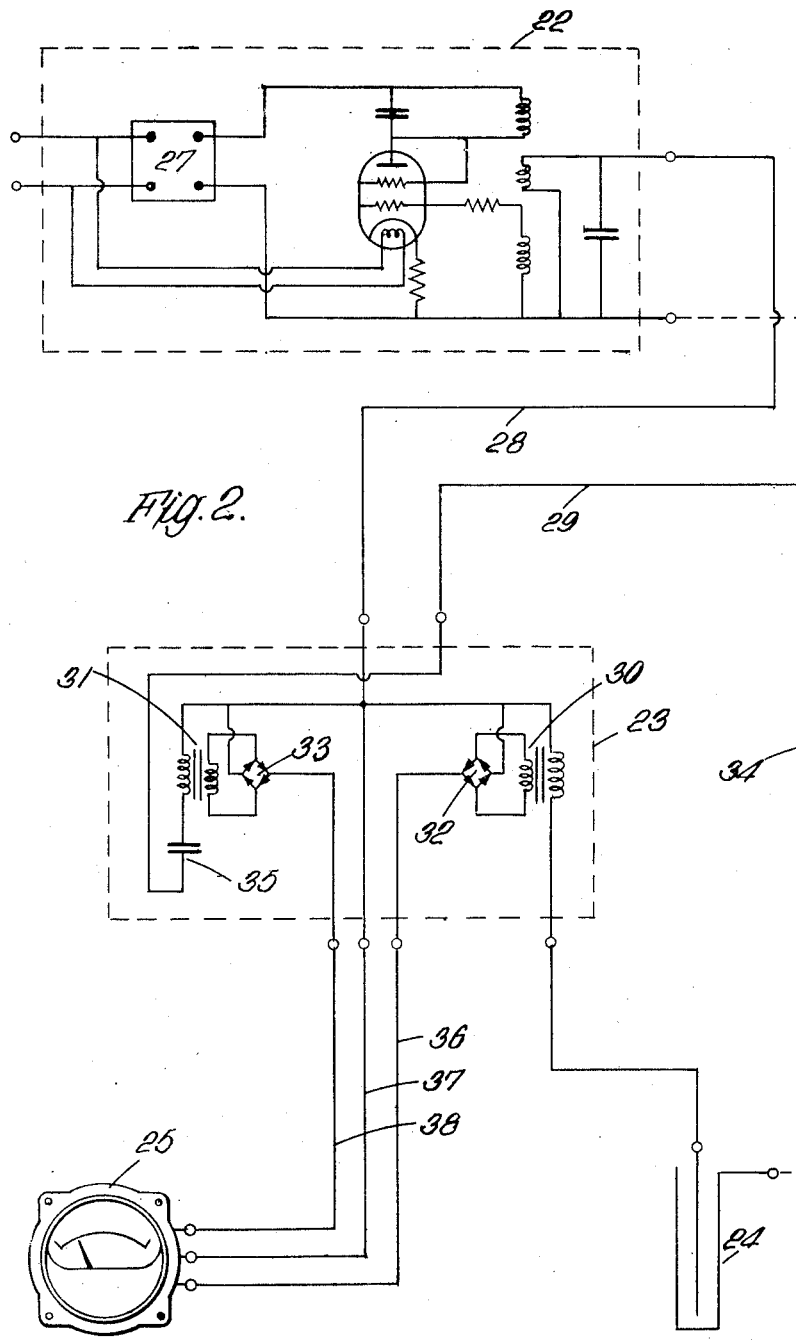

May 29, 1945.   S. J. SMITH   2,377,275
ELECTRICAL MEASURING OR INDICATING SYSTEM
Filed Oct. 27, 1943   2 Sheets-Sheet 1
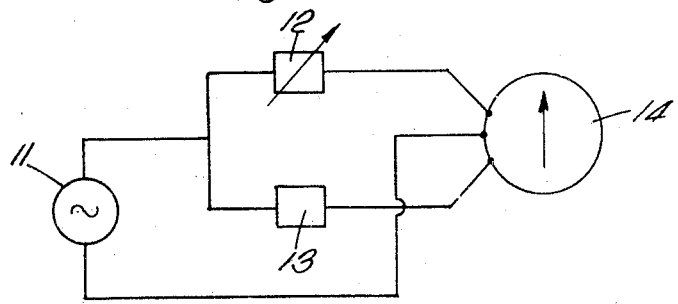
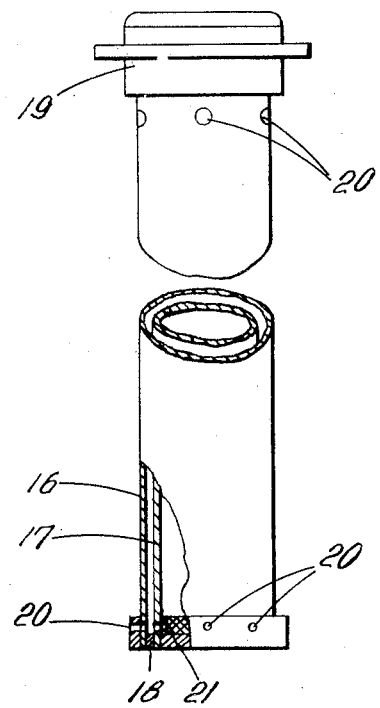
INVENTOR
S. J. Smith
BY Watson, Cole, Grindle & Watson
Attorneys Patented May 29, 1945

2,377,275

UNITED STATES PATENT OFFICE 2,377,275

ELECTRICAL MEASURING OR INDICATING SYSTEM

Stanley James Smith, London, England, assignor to Simmonds Aerocessories Limited, London, England Application October 27, 1943, Serial No. 507,873
In Great Britain October 20, 1942

6 Claims. (Cl. 73—304)

This invention relates to electrical measuring or indicating systems in which the change in a physical condition to be observed is applied to vary the reactance of an element in the measuring circuit.

Such variable reactances are commonly arranged in an A. C. bridge circuit or are used to vary the frequency of an oscillatory circuit in order to obtain an indication of the change in magnitude of the reactance due to the change in the physical condition under observation. Such arrangements are, however, relatively complicated and uncertain in operation and it is an object of the present invention to provide a simple arrangement which shall be reliable and free from errors.

A further object of the present invention is to provide apparatus for measuring the change in magnitude of a reactance which is comparatively unaffected by variations in supply potentials.

Another object of the present invention is to provide apparatus for comparing the relative magnitude of two reactances.

A still further object of the present invention is to provide an improved liquid level gauge in which measurement is effected by measuring the capacity between two electrodes immersed in the liquid.

Other objects and advantages of the present invention will become apparent during the course of the following description of the accompanying drawings in which Fig. 1 is a diagrammatic representation of one form of the invention, Fig. 2 is a circuit diagram of apparatus for measuring liquid levels, and Fig. 3 is a side elevation partly in section of one form of measuring condenser for use with the apparatus of Fig. 2.

Referring to Fig. 1 there is shown a source of alternating current 11 one terminal of which is connected with one terminal of each of two reactances 12 and 13 of which the reactance 12 is variable as indicated by the arrow. The other terminal of the source 11 and the other terminals of the reactances 12 and 13 are connected with the terminals of an A. C. ratiometer 14. The currents flowing through the reactances 12 and 13 act in opposition on the moving system of the ratiometer and the deflection thereof is proportional to the ratio of these currents. Thus if the magnitude of one reactance 13 is fixed the deflection will be proportional to the change in magnitude of the variable reactance 12. Also changes in potential of the source 11 will have little effect on the accuracy of the system since as the two reactances are of the same order of magnitude potential changes will produce changes in the currents flowing through the two reactances which are in opposition as regards their effect on the meter 14.

While an A. C. ratiometer may be used in the above arrangement a D. C. instrument may also be used if the current output from the two reactances is first rectified.

It will be appreciated that the reactance whose magnitude is varied by the physical condition under observation may be inductive or capacitative as required by the conditions of use. The second reactance will normally be of the same sign and the arrangement in accordance with the invention operates essentially to compare the magnitude of the variable reactance against the magnitude of the second reactance.

Where linear dimensions are to be examined the variable may conveniently be applied to alter an air gap in the iron circuit of an inductance which thus acts as the variable reactance. Alternatively the variable reactance may take the form of a condenser the capacity of which is varied, e. g. by the movement of an electrode or by variations in the dielectric in which the condenser is immersed. This latter application is illustrated in Figs. 2 and 3 in which one form of the invention is shown in which dielectric changes are used to indicate liquid level. The condenser forming the variable reactance consists in this case of two suitably shaped electrodes, one of which may be the liquid container, and the capacity between them is changed by the rise and fall of liquid in the container.

As shown in Fig. 3 the measuring condenser consists of two concentric metal tubes 16 and 17, arranged vertically in, and extending from the top to the bottom of the liquid container. At their lower end the tubes are spaced apart by an insulating ring 18 and at their upper end are secured to a flanged head 19 for securing the whole assembly to the top of the liquid container. The top of the inner tube 17 is insulated from the head 19 but the outer tube 16 may be conveniently electrically connected with the head 19 and through it with the container. Apertures 20 covered by fine mesh wire gauze 21 are provided in the walls of the tubes, at the top and bottom, to permit the passage of air and liquid respectively into the space between the two tubes, the gauze serving to prevent the entrance of water and to provide a measure of damping on the flow of the liquid into the inter-tube space.

Referring now to Fig. 2 there is shown a wiring diagram of a liquid level indicating system embodying the invention and comprising a power unit 22, a rectifier unit 23, a measuring condenser 24 and a D. C. ratiometer 25. The power unit 22 comprises a vacuum tube oscillator generating alternating current at a frequency of some 20,000 C. P. S. and energised from a low tension direct current supply through a vibratory converter 27. Since the construction and operation of a vacuum tube oscillator of the kind shown forms no part of the present invention and is well understood by those skilled in the art it is believed that no further description is required.

The alternating current output of power unit 22 is fed through conductors 28 and 29 to rectifier unit 23. This unit which is preferably mounted in close proximity to the measuring condenser 24 comprises a pair of step down transformers 30 and 31 and rectifiers 32 and 33 whereby alternating current flowing through the fixed and variable reactances (12 and 13 of Fig. 1) is converted into direct current for transmission to the ratiometer 25. More specifically the alternating current flowing in conductor 28 divides in the rectifier unit 23, part flowing through the primary of transformer 30 and through the measuring condenser 24 back through ground conductor 34, and part flowing through the primary of transformer 31, fixed condenser 35 and back through conductor 29. The transformers 30 and 31 which as stated are of the step down variety serve to match the relatively high impedance of the measuring and fixed condensers 24 and 35 to the bridge rectifiers 32 and 33. In one practical application the capacity of the fixed condenser 35 and the maximum capacity of the measuring condenser 24 was approximately 1000 m. m. f. and the transformer ratio was 10:1. The direct current output of rectifier 32 is connected with one coil of ratiometer 25 through conductor 36 and common conductor 37 and the output of rectifier 33 is connected with the other coil of ratiometer 25 through conductors 38 and 37, the two coils of the ratiometer being wound on a common former moving in a non-uniform magnetic field in the known manner.

In operation current from the power unit 22 flows through the fixed and the measuring condensers 35 and 24 respectively, and the rectifiers 32 and 33 are so poled that, with no liquid present, the currents flowing in the two windings of the meter 25 are opposed and cause it to read zero. As the liquid level rises the capacity of the measuring condenser 24 increases, the ratio of the two currents flowing in the instrument changes and the instrument indicates the change in level. If desired, the condenser 35, instead of being fixed, may be variable whereby adjustment of the zero reading of the ratiometer 25 may be effected.

It will be appreciated that since the indicating instrument responds to current ratios the system will be comparatively unaffected by changes of voltage or frequency of the source of current. Similarly, changes of temperature will have very little effect and the system may be adjusted to have a zero temperature coefficient at any one setting, preferably at zero liquid level.

The liquid level indicating system herein described has many advantages over prior arrangements using capacity changes to indicate liquid level. Provided that the rectifier unit is positioned fairly near to the measuring condenser any desired length of conductor may be used between the power unit and the rectifier unit or between the rectifier unit and the ratiometer. No special screening is required and the system is comparatively immune from effects due to changes in voltage frequency or wave form. Moreover, particularly for aircraft the design of the measuring condenser may be such that changes in attitude of the liquid container do not affect the indicated liquid contents.

Although the invention has been described more particularly in connection with the measurement of liquid level it will be apparent to those skilled in the art that the circuit of the present invention finds many other applications where it is desired to compare reactances or to indicate the changes in magnitude of a reactance and that such changes in magnitude may be effected by any physical change the extent of which it is desired to indicate.

I claim:

1. Apparatus for indicating changes in magnitude of a variable reactance comprising a ratiometer having two coils, a first transformer having primary and secondary windings, terminals for connection to a source of alternating current, the said primary winding and the said variable reactance being connected in series and with said terminals, a first rectifier connected with the said secondary winding and with one coil of the ratiometer, a second transformer having primary and secondary windings, a fixed reactance connected in series with the primary winding of said second transformer and with the said terminals, and a second rectifier connected with the secondary winding of said second transformer and with the other coil of said ratiometer.

2. A direct reading liquid level indicating system comprising a measuring condenser having electrodes adapted to be immersed in the liquid, whereby changes in liquid level change the capacity of the said condenser, a reference condenser, means for connecting said condensers in parallel with a source of alternating current, means for producing direct currents proportional to the alternating currents flowing through the measuring and the reference condensers, and means comprising a ratiometer having two deflecting coils for indictaing the ratio of the direct currents.

3. A direct reading liquid level indicating system comprising a measuring condenser having electrodes adapted to be immersed in a liquid container, whereby changes in liquid level change the capacity of the said condenser, an adjustable reference condenser, means for connecting said condensers in parallel with a source of alternating current, rectifying means for producing a direct current proportional to the alternating current flowing through each of said condensers, and means comprising a ratiometer having two deflecting coils for indicating continuously the ratio of said direct currents.

4. A direct reading liquid level indicating system comprising a measuring condenser having electrodes adapted to be immersed in the liquid, whereby changes in liquid level change the capacity of the said condenser, a first transformer having primary and secondary windings, means for connecting said condenser and said primary winding in series with a source of alternating current, a reference condenser, a second transformer having primary and secondary windings, means for connecting said reference condenser and the primary winding of said second transformer in series with said source, means for rectifying the alternating current output of the secondary windings of each transformer, and a ratiometer for indicating the ratio of the said rectifier outputs.

5. A direct reading liquid level indicating system comprising an indicating ratiometer having two coils, a measuring condenser adapted to be immersed in a liquid container, whereby changes in liquid level change the capacity of the said condenser, a first transformer having primary and secondary windings, means for connecting said measuring condenser and the primary winding of said transformer in series with a source of alternating current, rectifying means connected with the secondary winding of said transformer and with one coil of the ratiometer, a reference condenser, a second transformer having primary and secondary windings, means for connecting said reference condenser and the primary winding of said second transformer in series with the source, and rectifying means connecting the secondary winding of the second transformer with the other coil of the said ratiometer.

6. A direct reading liquid level indicating system comprising a measuring reactance adapted to be associated with the liquid so that changes in liquid level change the value of the said reactance, a reference reactance, means for connecting said reactances in parallel with a source of alternating current, means for producing direct currents proportional to the alternating currents flowing through the measuring and the reference reactances, and an indicating device responsive to the said direct currents for indicating the ratio thereof.

STANLEY JAMES SMITH.